C. G. LEA.

CAR VENTILATION.

No. 7,578. Reissued March 27, 1877.

Witnesses:

L. L. Lusabaugh

F. C. Brecht

Inventor:

Chas. G. Lea per attys.

A. H. Evans & Co.

THE NORRIS PETERS CO., PHOTO-LITHO., WASHINGTON, D. C.

UNITED STATES PATENT OFFICE.

CHARLES G. LEA, OF ALTON, ILLINOIS.

IMPROVEMENT IN CAR-VENTILATION.

Specification forming part of Letters Patent No. 175,717, dated April 4, 1876; reissue No. 7,578, dated March 27, 1877; application filed September 13, 1876.

*To all whom it may concern:*

Be it known that I, CHARLES G. LEA, of Alton, Madison county, Illinois, have invented a new and Improved Car-Ventilator, of which the following is a specification:

My invention consists of a monk's-hood blower, with a pipe extending into a water-tank, and another pipe for conducting the air from the tank into the car, together with similar blowers for effecting exhaust from the car to aid in inducing an active current of fresh air into the car, and for actively conducting the air out after it has been used; but I mean to use the exhaust-blowers with or without the tank and inlet blower. The air passes over the surface of the water in the tank, so that the dust contained in it will be projected into the water, where it will lodge, so as not to be driven into the car.

Figure 1:
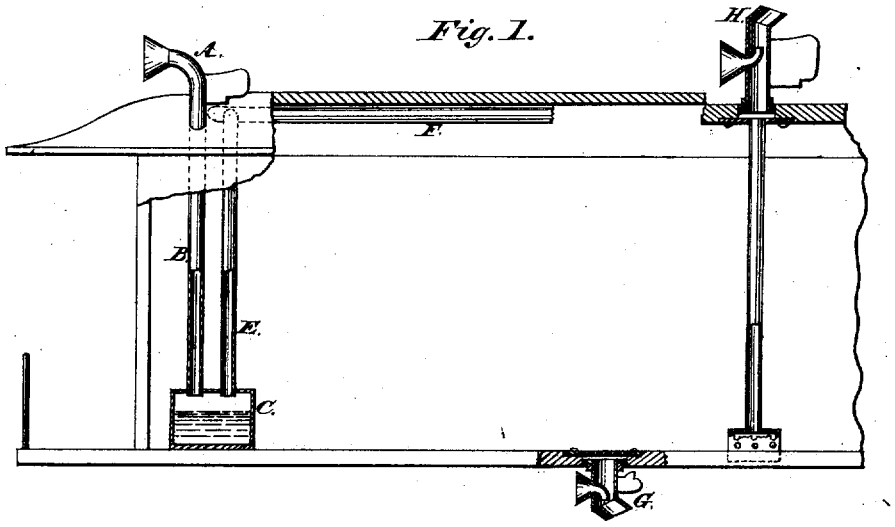
Figure 2:
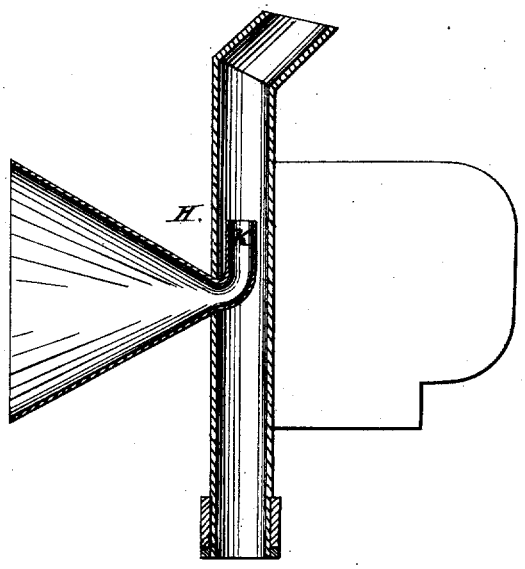

Figure 1 is a sectional elevation of a car with my improved ventilating apparatus, and Fig. 2 is a detail of one of the monk's-hood blowers for effecting the exhaust.

Similar letters of reference indicate corresponding parts.

A is the funnel or monk's hood for taking the air into the car through pipe B, tank C, and pipes E F. G is a blower attached to the bottom, and H another attached to the top for exhausting the car, and thus making a lively action of air in it. The blowers G and H are both contrived for driving off the air from the bottom of the car while the fresh air enters at the top. These blowers or exhausts consist of a large pipe, H, extending from the inside of the car near the top to the outside, with a smaller pipe, K, entering the larger one, with a funnel attachment, as shown in Fig. 2.

The operation of the exhaust is as follows: The motion of the cars creating a draft through the smaller pipe, causes a strong current of air toward, and extending through the outlet of the main pipe, thus causing a heavy draft or suction from inside the car, thus effectively and fully ventilating the same.

Having thus described my invention, what I claim as new, and desire to secure by Letters Patent, is—

1. In combination with a railway-car having one or more exhaust-ventilators, the inlet-ventilator, consisting of the monk's hood A, and pipes B, E, and F, communicating with the water-tank C, for purifying the air, constructed substantially as described.

2. An exhaust for a railway-car, consisting of the large pipe H, extending from inside the car to the outside, in combination with the smaller pipe K, provided with the funnel attachment, and entering the larger pipe, and extending toward the outlet of the same, all constructed and arranged, substantially as and for the purpose set forth.

CHARLES G. LEA.

Witnesses:
CHARLES P. RADER,
FRED. GASKINS.